United States Patent [19]

Steffen

[11] 4,085,862

[45] Apr. 25, 1978

[54] AUTOMATICALLY CONTROLLED SEED PLANTER

[75] Inventor: David Eugene Steffen, Chatham, Ill.

[73] Assignee: Dickey-john Corporation, Auburn, Ill.

[21] Appl. No.: 730,784

[22] Filed: Oct. 8, 1976

[51] Int. Cl.² ............................................. G07F 11/00
[52] U.S. Cl. ........................................ 221/8; 221/13; 221/185; 221/211; 111/1
[58] Field of Search ............................ 221/2, 4, 7–14, 221/185, 211; 111/1

[56] References Cited

U.S. PATENT DOCUMENTS

| | | | |
|---|---|---|---|
| 3,648,631 | 3/1972 | Fiedler | 221/185 |
| 3,653,538 | 4/1972 | Lamar | 221/13 |
| 3,912,121 | 10/1975 | Steffon | 221/13 |

*Primary Examiner*—Allen N. Knowles

*Attorney, Agent, or Firm*—Olson, Trexler, Wolters, Bushnell & Fosse, Ltd.

[57] ABSTRACT

An automatically controlled seed planter apparatus is disclosed for planting seeds concurrently in a plurality of rows with controlled seed spacing, including a rotating drum for holding the seeds and transporting the seeds to a plurality of chutes. The apparatus includes transducers for detecting the rotational speed of the drum and for detecting the speed of the planter along the ground. The operator is provided with input controls for setting in signals corresponding to the desired seed spacing and to the configuration of the drum used. The above-mentioned signals are then fed to a control system which processes the signals to form an output signal which controls the rotational speed of the drum, resulting in a controlled seed spacing. A readout device is also provided for the operator to monitor the expected seed spacing produced in this manner by the apparatus, as well as warning the operator of any malfunctions in the system.

19 Claims, 5 Drawing Figures

AUTOMATICALLY CONTROLLED SEED PLANTER

BACKGROUND AND OBJECTS OF THE INVENTION

The present invention relates to a novel control apparatus and more specifically to a novel control apparatus controlling the distribution and spacing of discrete articles. While the main features of this invention may be adapted for different uses, the disclosure will be facilitated by directing it particularly to the problem of controlling the spacing of seeds being discharged by a planter.

As is well-known, a farmer engaged in mechanized planting of seeds utilizes a planting machine pulled behind a tractor. One form of planting machine commonly in use includes at least one rotating drum which holds the supply of seeds to be planted and has means for delivering the seeds to one or more chutes which conduct the seeds to the desired planting rows on the ground. With planting equipment of this type heretofore in general use, it has usually been difficult, if not impossible, for the farmer to determine with any degree of accuracy, the resulting seed spacing from the operation of the machinery. To determine the seed spacing from which the number of seeds planted per acre can be readily determined, the farmer must take into account the speed at which the rotating drum is operating for depositing seeds into the chute, as well as the ground speed of the planter.

Therefore, it is an object of the present invention to provide a novel means for controlling the seed spacing from a planter with a degree of accuracy not heretofore possible by manual means of control.

A further object of the invention is to provide a novel control system which may be readily adjusted and set for a desired seed spacing without any need for the farmer to consult charts or perform computations to determine a speed setting for the drum rotation, or the proper speed at which to drive his tractor.

Another important object of the invention is to provide a novel control system for enabling the planting process to remain controlled with no need for additional adjustments by the farmer after an initial setting of the desired seed spacing.

Still another object of this invention is to provide a novel control system of the above-described type constructed so that there is no need constantly to watch the speed of the tractor or the speed of the drum or to stop the planting operation to make adjustments, and so that the operator will be warned automatically of any malfunction.

SUMMARY OF THE INVENTION

The present invention includes transducers which monitor the speed of rotation of the drum on the planter as well as the ground speed of the planter. The operator is provided with controls for setting in the desired seed spacing and for selecting a setting corresponding to the configuration of the drum which is being used. A control device is provided which receives the signals corresponding to drum speed, ground speed, drum configuration and desired seed spacing and combines these signals to provide an output control signal which is fed back to the field coil of the alternator which powers the motor which drives the drum. Readout signals are also provided to indicate the seed spacing to be expected from the drum speed and ground speed signals received at the input of the control device as well as warning indicators for such malfunctions as excessive rotational speed of the drum, failure of the drum to rotate at all, and a loss of signals from either the drum or the ground speed indicators.

Other objects and advantages of the present invention will become apparent from the following description of the accompanying drawings wherein:

DETAILED DESCRIPTION OF THE ILLUSTRATED EMBODIMENT

Figure 1:
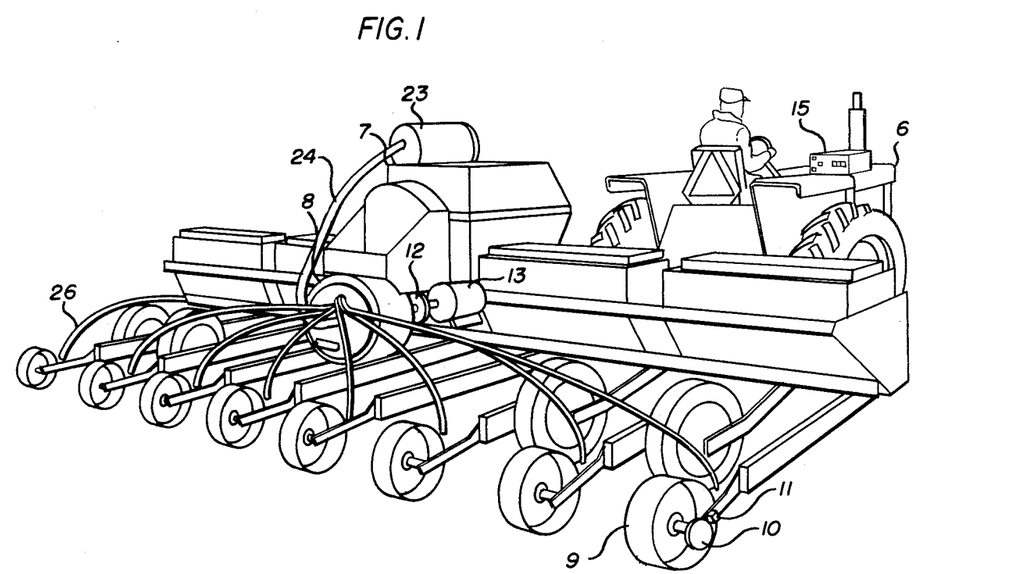
FIG. 1 is a view of a seed planter in combination with a rotating drum and a control apparatus incorporating the features of the present invention.

Referring now to FIG. 1, the basic components of the automatic planter control system of the present invention are illustrated. A tractor 6 or any other suitable vehicle, is utilized to transport a planter 7, over a field to be planted. The planter 7 may be of various known constructions and need not be described in detail. It suffices to state that the planter 7 includes a rotatable drum 8 mechanically driven by a suitable D.C. permanent magnet motor 13. In the particular embodiment shown for the purpose of illustrating one form of this invention, the drum 8 is in a planter 7 having eight planting units. It is understood, however, that the automatically controlled seed planter apparatus may be adapted for association with planters having any desired number of planting units. The planting units may also be of various known constructions and need not be described in detail.

The apparatus according to the present invention also includes a transducer comprising a multiple pole circular magnet 10 mounted to the shaft of the press wheel 9, and a wire-wound coil 11 which senses the magnetic poles of the magnet. In the embodiment shown, the magnet has 40 poles. Also provided (not shown) is means for transmitting the signal from the wire-wound coil 11 to the panel 15 of the control system which may be conveniently mounted in the tractor.

Figure 2:
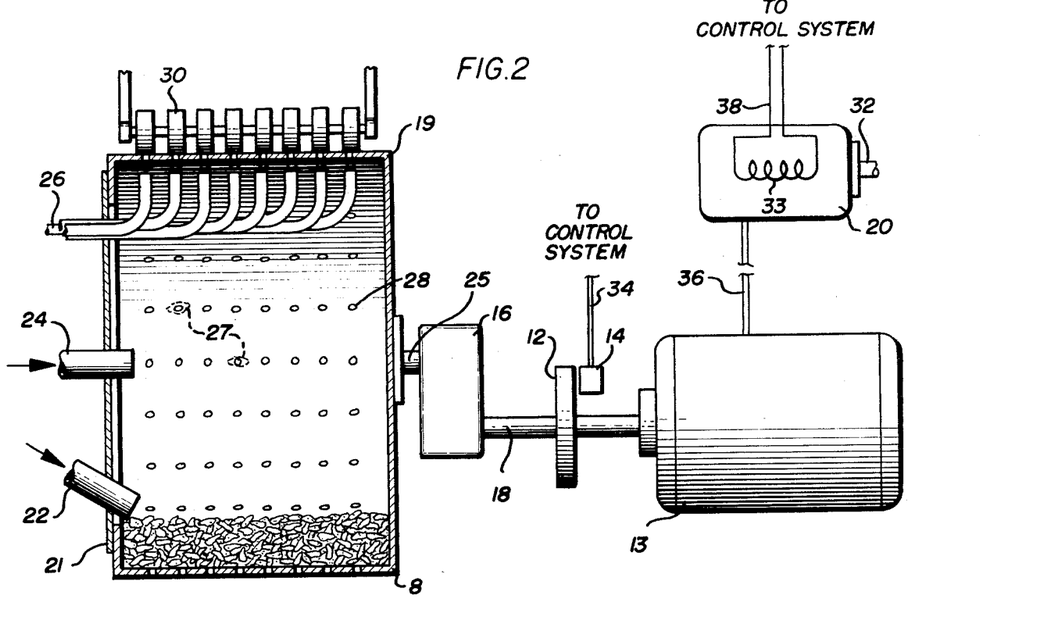
FIG. 2 is a cross-section of a rotating drum in combination with a speed reducer, motor, motor speed transducer, and alternator incorporating features of the present invention.

Referring now to FIG. 2, a cut-away view of the drum 8 is shown along with associated drive and transducer means. One end wall of the drum 21 remains stationary while the rest of the drum 19 is rotatable. The drum is provided with means 22 for introducing seed thereto. A blower 23 is mounted on the planter for delivering air under pressure to the drum through pressure or conduit means 24. While in operation, the drum rotates about its shaft 25, and the air under pressure within the drum causes the seeds 27 contained in a mass at the bottom of the drum to be individually selected and to be held against a plurality of holes 28 in the peripheral drum wall. Rows of holes are arranged in columns disposed around the circumference of the drum, each column corresponding to one planting row. Rollers 30 are mounted in contact with the top of the drum in association with each row of holes, as shown in FIG. 2. As the holes come in contact with the rollers 30 during rotation of the drum, the rollers 30 block off the holes, causing the air pressure to force the seeds into the chutes 26 to be planted.

The planter drums may have various different hole configurations and spacings, both circumferentially and axially. The apparatus, according to the present invention, makes provisions for such various drum hole configurations and spacings, as will be described in detail later. The drum is rotated on its shaft 25 by means of the D.C. permanent magnet motor 13 which drives the drum shaft 25 through motor shaft 18 and gear speed reducer 16. A motor speed transducer is provided which comprises a multiple pole circular magnet 12 mounted on the motor shaft 18 which in the embodiment shown is a 20-pole magnet. A wire-wound coil 14 is associated with the magnet 12 and communicates with the control system via cable 34. The motor 13 is powered by the alternator 20 by means of cable 36. The alternator 20 is driven by shaft 32 which may be connected to the power take-off of the tractor or to a hydraulic motor (not shown) driven by the power take-off of the tractor. The field coil 33 of the alternator 20 is connected to the control system by means of cable 38.

Figure 3:
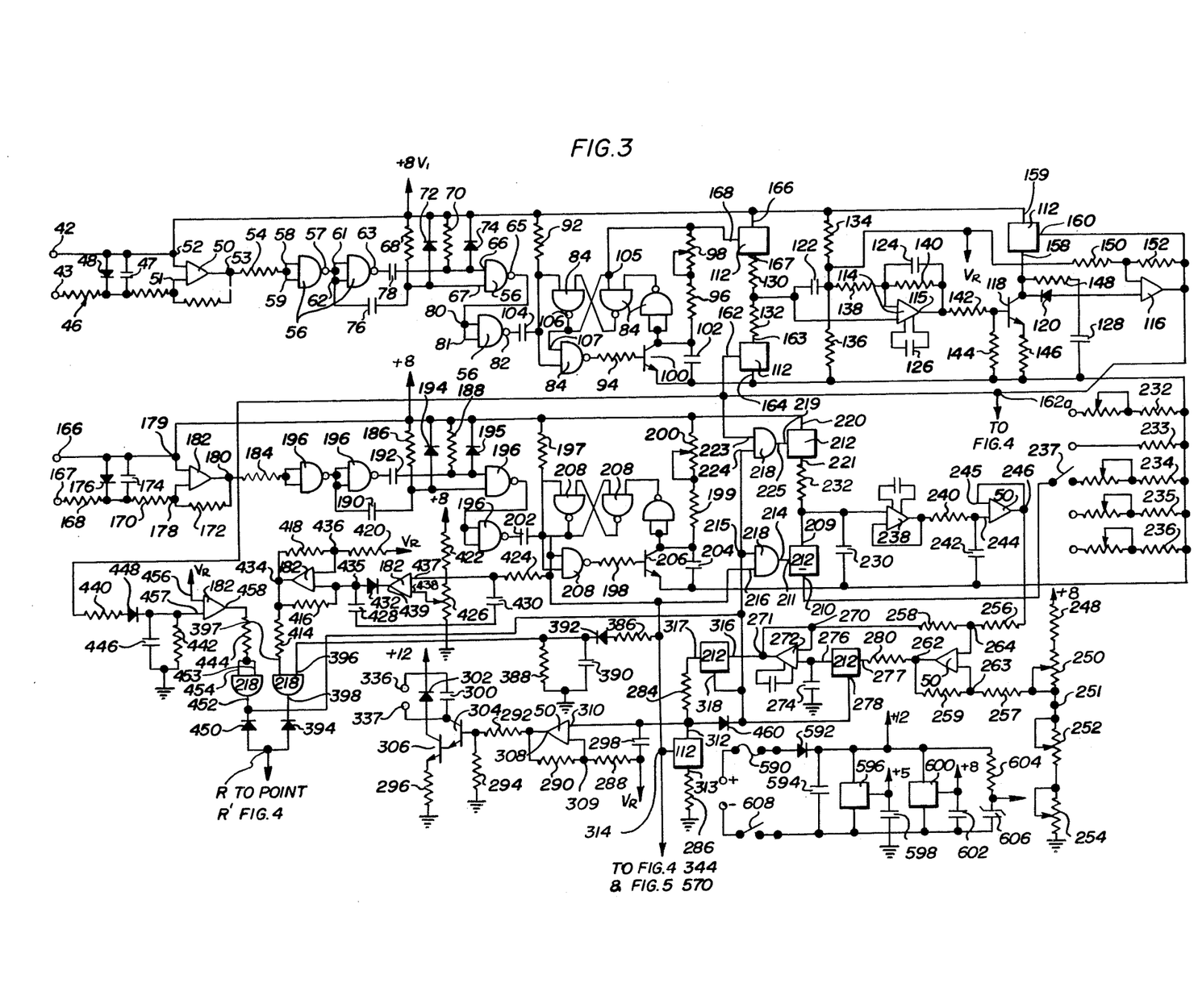
FIG. 3 is an electrical schematic view of an embodiment of a portion of a control circuit incorporating features of the present invention.

Referring to FIG. 3, a control system incorporating features of this invention is shown in detail. At the upper left portion of FIG. 3, terminals 42 and 43 terminate the lines leading from wire-wound coil 11, of FIG. 1, which is sensing the magnetic poles of the 40-pole circular magnet 10, of FIG. 1, mounted to the shaft of the press wheel 9, of FIG. 1, whose circumference is, in the embodiment shown, 56 inches, providing a signal proportional to the ground speed of the planter. Resistor 46 and capacitor 47 filter out any noise that may be coming in from the two lines terminating at 42 and 43. Diode 48 insures that the voltage feeding into the following operational amplifier remains within acceptable limits. An operational amplifier in IC package 50 defined by terminals 51, 52 and 53 acts as a wave shaper to convert the incoming sine wave into a square wave. Resistor 54 connected to output terminal 53 facilitates the interfacing of the preceding operational amplifier operating on 12 volts to a following CMOS gate operating on 8 volts. The gate in integrated circuit package 56 defined by the terminals 57, 58 and 59 acts as a buffer to convert from 12-volt operational amplifier output voltage characteristics to CMOS 8-volt logic characteristics. Additional gates in integrated circuit package 56 defined by terminals 61, 62 and 63 and by terminals 65, 66 and 67, resistors 68 and 70, diodes 72 and 74, capacitors 76 and 78 constitute a frequency doubler which gives output pulses on both the leading and trailing edges of the square wave input at terminal 61. Another gate in integrated circuit package 56 defined by terminals 80, 81 and 82 inverts these output pulses to provide the correct logic levels to feed into the following stage.

Four gates in integrated circuit package 84, and with resistors 92, 94, 96 and 98, transistor 100 and capacitor 102 constitute a retriggerable one-shot connected to the output 82 of the integrated circuit 56. Capacitor 104 allows the one-shot to be triggered by the aforementioned inverter circuitry. The one-shot puts out a voltage pulse of constant width at terminals 105, 106 and 107 every time it is triggered. These pulses are proportional to the distance travelled by the planter in the ratio of 0.714 pulses per inch or 1.4 inches per pulse. Variable resistor 98 adjusts the desired pulse width. These pulses are fed into an analog frequency multiplier stage consisting of the three transmission gates in integrated circuit package 112, two operational amplifiers, 114 and 116, transistor 118, diode 120, capacitors 122, 124, 126 and 128 and resistors 130, 132, 134, 136, 138, 140, 142, 144, 146, 148, 150 and 152. The frequency multiplier functions as follows: resistor 134 and resistor 136 constitute a voltage divider to obtain a reference voltage $V_R$ (4 volts) that is one-half of the supply voltage (8 volts). The voltage across capacitor 122 with respect to $V_R$ is multiplied by the circuit consisting of resistors 138, 140, capacitors 124 and 126, and operational amplifier 114, with the multiplication factor of 470. A small voltage developed across capacitor 122, therefore, results in a large voltage being developed at terminal 115 of operational amplifier 114 with respect to $V_R$. Resistors 142 and 144 constitute a voltage divider dividing down the voltage developed at terminal 115 of operational amplifier 114, which is determined by the voltage across capacitor 122. Transistor 118 and resistor 146, along with the voltage divider formed by resistors 142 and 144, form a voltage controlled current sink. Resistors 148, 150 and 152, capacitor 128, diode 120, and a transmission gate defined by terminals 158, 159 and 160 in integrated circuit package 112, in conjunction with the current sink previously discussed constitute a variable frequency generator whose output pulse is of a constant width as determined by resistor 148 and capacitor 128. This constant pulse width is fed back into the transmission gate defined by terminals 162, 163 and 164 in integrated circuit package 112. Thus, for every pulse produced by the output of the one-shot formed by the gates of integrated circuit 84, the capacitor 122 is charged through resistor 130 and the transmission gate defined by terminals 166, 167 and 168 in integrated circuit package 112. For every pulse produced by the output of the frequency multiplier, capacitor 122 is discharged by the resistor 132 and the transmission gate defined by terminals 162, 163 and 164 in integrated circuit package 112, during the duration of the pulse. The frequency ratio of the input to output pulses at capacitor 122 is dependent upon the pulse width of the input or charging pulse, the pulse width of the output or discharging pulse and the ratio of resistor 130 to resistor 132.

The circuit will automatically adjust the output frequency at terminal 162 such that the voltage across capacitor 122 remains at the reference voltage $V_R$.

Referring now to the lefthand side at the middle of FIG. 3, terminals 166 and 167 terminate the lines leading from the wire-wound coil 14, of FIG. 2, which is sensing the magnetic poles of the 20-pole circular magnet 12, of FIG. 2, mounted on the motor shaft 18, of FIG. 2, providing a signal proportional to drum rotational speed. The following wave-shaper defined by resistors 168, 170 and 172, capacitor 174, diode 176, and an operational amplifier defined by terminals 178, 179 and 180 of integrated circuit package 182, and a frequency doubler defined by the resistors 184, 186 and 188, capacitors 190 and 192, diodes 194 and 195 and four gates in integrated circuit package 196, and a one-shot defined by resistors 197, 198, 199 and 200, capacitors 202 and 204, transistor 206 and four gates in integrated circuit package 208 performs equivalently with respect to the drum rotational speed signal to the function of the first half of the circuit previously described with respect to the ground speed signal. The output pulses appearing at terminal 216 of a gate in IC package 218 defined by terminals 214, 215 and 216 are then gated through to a transmission gate defined by terminals 209, 210 and 211 in integrated circuit package 212. The ground speed signal output pulses from terminal 162 are gated through to a transmission gate defined by terminals 219, 220 and 221 in integrated circuit package 212 by a gate defined by terminals 223, 224 and 225 of integrated circuit package 218. Each such pulse from terminal 162 turns on the transmission gate defined by terminals 219, 220 and 221 in integrated circuit package 212 thereby charging capacitor 230 through resistor 232. Each drum rotation signal pulse from terminal 216 turns on the transmission gate defined by terminals 209, 210 and 211 in integrated circuit package 212, thereby discharging capacitor 230 through one of five resistors 232 through 236 which are determined by the position of the switch 237, which is set by the operator on the control panel to correspond to the particular configuration of the drum being used. The voltage across capacitor 230 is buffered by an operational amplifier 238 and then integrated by resistor 240 and capacitor 242 and buffered again by an operational amplifier defined by the terminals 244, 245 and 246 in integrated circuit package 50.

The voltage across capacitor 230 may now be calculated as follows:
Terms used in the calculation are defined as follows:
$T_x$: the pulse width of the output at terminal 162, the ground speed signal.
$T_2$: the pulse width of the output at terminal 216, the drum rotation speed signal
$F_x$: number of pulses obtained at the output terminal 162 per inch of travel of the press wheel.
$F_2$: number of pulses obtained at the output terminal 0.216 per inch of seed spacing
S: the desired seed spacing in inches per seed.
H: the number of holes per planting row in the drum being used. The present illustration is set to work with values of H of 24, 36, 72, 96 and 144, which represent the drum configurations presently in use. Minor modifications, as will be shown later, will allow any value of H to be accommodated.
R: the value of the resistor selected by switch 237.
$V_{cc}$: the supply voltage.
$V_o$: voltage across capacitor 230 and also appearing at terminal 246 of the operational amplifier defined by terminals 244, 245 and 246 in integrated circuit package 50.
X: frequency multiplication circuit rate set by resistor 98, multiplier of ground speed pulses.

The 40-pole magnet 10 on the press wheel gives 20 square-wave pulses per revolution of the press wheel at the output of the wave-shaper at terminal 168. Since the press wheel is 56 inches in circumference this gives 0.357 pulses per inch travelled. At the output of the doubler and multiplier circuits at terminal 162, therefore, $F_x = 714 X$ pulses per inch travelled. In the motor drive system there is, in the embodiment shown, an 80 to 1 speed reducer between the motor and the drum. The 20-pole magnet on the motor shaft therefore gives 800 square wave pulses at terminal 180 for every revolution of the drum. Following the doubler circuit formed by the gates of integrated circuit package 196 this becomes 1600 pulses per revolution of the drum. Dividing by H gives the number of pulses per seed. Dividing this result by seed spacing, S, gives the number of pulses per inch of seed spacing. This results in $F_2 = 1600/SH$.

In order for the voltage across capacitor 230 to be at equilibrium, the current pumped into the capacitor through resistor 232 and the current discharged from the capacitor through resistor R (selected by switch 237) must be equal. This gives:

$$\frac{T_x F_x}{R232}(V_{cc}-V_o) = \frac{T_2 F_2}{R} V_o$$

Solving for $V_o$: $V_o = \dfrac{1}{1 + \dfrac{T_2}{T_x} \dfrac{F_2}{F_x} \dfrac{R232}{R}} V_{cc}$ substituting for $F_2$ and $F_x$, and setting $T_2 = T_x$ $$\frac{S V_{cc}}{S + \frac{2241}{XH} \frac{R232}{R}}$$

setting $\dfrac{2241}{XH} \dfrac{R232}{R} = 1$, $V_o = \dfrac{S}{S+1} V_{cc}$ the proper value for R is then determined by:

$$R = \frac{2241}{XH} R232.$$

Resistors 248, 250, 252 and 254 constitute a voltage divider network. Resistor 252 is an adjustable potentiometer that is located on the front control panel 15 and is used to dial-in the desired seed spacing. Resistors 250 and 254 are variable resistors used to adjust internally for accumulated tolerances. The voltage at terminal 251 is then $$V_{251} = \frac{R252+R254}{R252+R254+R250+R248}$$

substituting R' for R252+R254 and R" for R250+R248:

$$V_{251} = (R'/R'+R'') V_{cc}$$

The form of this equation is comparable to the form of the equation derived for the voltage across capacitor 230. S may be equated with R'. This configuration gives a linear scale on the control panel for dialing-in seed spacing on resistor 252.

Resistors 256, 257, 258 and 259 along with an operational amplifier defined by terminals 262, 263 and 264 in integrated circuit package 50 constitute a voltage difference translator. The voltage difference between terminal 246 of an operational amplifier defined by terminals 244, 245 and 246 in integrated circuit package 50 and the voltage at terminal 251 is generated by the voltage difference translator between terminal 262 of an operational amplifier defined by terminals 262, 263 and 264 of integrated circuit package 50 and terminals 270 and 271 of integrated circuit package 272. Integrated circuit 272 is a buffer for the voltage across capacitor 274. With a transmission gate defined by terminals 276, 277 and 278 in integrated circuit package 212 turned on, any differential voltage introduced into the voltage difference translator produces the same voltage differential across resistor 280, charging or discharging capacitor 274 linearly. The voltage across capacitor 274, as will be shown later, controls the speed of the motor driving the drum. If the drum motor speed is insufficient to achieve the desired seed spacing as set in on resistor 252, the voltage across capacitor 230 increases. This voltage is also present at terminal 246 of an operational amplifier determined by terminals 244, 245 and 246 of integrated circuit package 50 and produces a differential with respect to the voltage at terminal 251. This voltage differential is then sent through the aforementioned translation circuitry which charges capacitor 274 linearly. As capacitor 274 charges, the voltage becomes greater and the drum motor speeds up. The voltage across capacitor 230 then decreases until the voltage differential with respect to the voltage at terminal 251 is nullified. At this point there is no voltage differential between terminal 246 and terminal 251 and, therefore, capacitor 274 neither charges nor discharges. Equilibrium has been reached. Similarly, the aforementioned circuitry operates to decrease the drum motor speed if it is too great in light of the desired seed spacing set in by resistor 252, or if the desired seed spacing is changed by changing the setting of resistor 252.

Because of several RC time constants within the above-described circuitry, an instantaneous change in drum motor speed is not immediately detectable nor is it compensated for quickly. Therefore, a quick recovery output stage is included in order to compensate for such instantaneous changes in drum motor speed. This circuit includes resistors 284, 286, 288, 290, 292, 294 and 296, capacitors 298, 300, diode 302, transistors 304 and 306, an operational amplifier defined by the terminals 308, 309 and 310 in integrated circuit package 50, and transmission gates defined by terminals 312, 313 and 314 in integrated circuit package 112 and by terminals 316, 317 and 318 in integrated circuit package 212. The voltage at terminal 271 of integrated circuit 272 charges capacitor 298 through resistor 284 and the transmission gate defined by terminals 316, 317 and 318 in integrated circuit package 212. Capacitor 298 is discharged through resistor 286 and the transmission gate defined by terminals 312, 313 and 314 in integrated circuit 112 during the duration of the one-shot pulse which is generated by the gates in integrated circuit 208.

The voltage generated across capacitor 298 is compared to the reference voltage $V_R$ (one-half of the supply voltage) which is obtained from the voltage divider of resistors 134 and 136 as described previously. The differential in these two voltages is then amplified by a factor of 470 by the amplifier circuit comprising resistors 288 and 290 and the operational amplifier defined by terminals 308, 309 and 310 in integrated circuit package 50. The output of this amplifier is followed by a voltage divider circuit composed of resistors 292 and 294. This is followed by a Darlington pair composed of transistors 304 and 306 set up in emitter follower configuration which functions as a current sink.

The field winding 33 of the alternator 20 is connected through the cable 38, shown in FIG. 2, between the points 336 and 337. A small voltage differential across capacitor 298, therefore, is amplified by the amplifier circuit described above to produce a large change in the field current supplied to the alternator. If the motor is turning too slowly to discharge enough current through resistor 286, capacitor 298 charges, producing a positive voltage differential between terminal 310 of the operational amplifier defined by terminals 308, 309 and 310 in integrated circuit package 50 and the reference voltage $V_R$, which differential is multiplied by 470. This increases the voltage to the emitter follower configuration which, in turn, increases the current being sinked through the field coil of the alternator. This, in turn, results in an increased output from the alternator to the armature of the motor, thereby increasing motor speed. If the motor speed is too high, the converse occurs.

Figure 4:
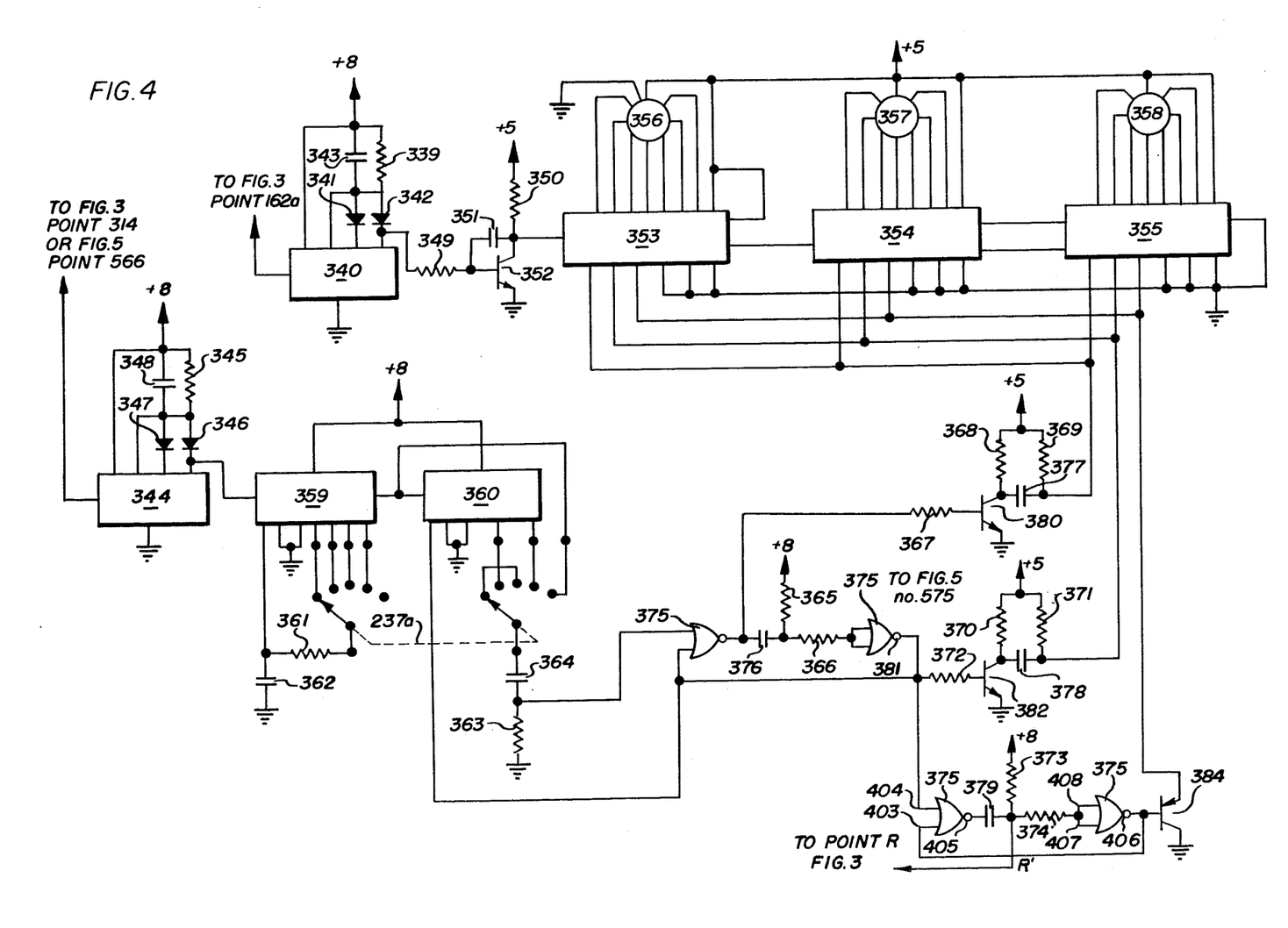
FIGS. 4, 5 are electrical schematic views of embodiments of other portions of a control circuit incorporating features of the present invention.

Referring to FIG. 4, a schematic diagram is shown of the circuitry that provides an accurate readout of the seed spacing to be expected from the combination of a given drum rotational speed and a given ground speed. Divider circuits comprising resistors 339 and 345, capacitors 343 and 348, diodes 341, 342, 346 and 347, and integrated circuits 340 and 344 divide, respectively, the input pulses corresponding to drum rotational speed from terminal 162, of FIG. 3, and the input pulses corresponding to ground speed of the planter from terminal 314, of FIG. 3. The divider circuits divide the aforementioned input pulses by 96 to facilitate averaging over a long period. This also allows for a more reasonable update rate for the digital readout. The output of integrated circuit 340 is then sent through an interface stage, comprising resistors 349, 350, capacitor 351, and transistor 352 to change the logic levels from 8 volts to 5 volts, and then into a 3-digit counter chain made up of integrated circuits 353, 354 and 355 which are connected to a digital readout. In the embodiment shown, the readout is in the form of incandescent indicator tubes 356, 357 and 358. At the output of integrated circuit 344 a divider network is used to accommodate the various possible drum hole configurations. A 5-position switch 237a which is ganged to switch 237 of FIG. 3 allows the operator to select the proper divider input for the given drum hole configuration. Integrated circuits 359 and 360 in conjunction with resistors 361 and 363 and capacitors 362 and 364 then provide the properly divided output signal, corresponding to the drum configurations selected by switch 237 and 237a. This output is then fed into the circuit composed of four gates of integrated circuit 375 and resistors 365, 366, 367, 368, 369, 370, 371, 372, 373 and 374, capacitors 376, 377, 378 and 379, and transistors 380, 382 and 384. This circuit provides pulses to the counters 353, 354 and 355 to: clear the counters (the pulses at the output of transistor 380), latch the display on the present number (the pulses at the output of transistor 382) and blank the readout momentarily to indicate an update (the pulses at the output of transistor 384).

Referring again to the previous equations, the pulses per inch signal received at the input of integrated circuit 340, representing ground speed, are given by the equation $F_x = 0.714X$. The pulses per inch received at the input of integrated circuit 344, corresponding to drum rotation, are given by the equation $F_2 = 1600/SH$. Letting K represent the divisor formed by the action of the integrated circuits 359 and 360, the output of these dividers can be represented by $F_2/K$, or $1600/SHK$.

In order to get the readout to include one significant digit to the right of the decimal point, the ratio of the output at transistor 352 which is represented by $F_x$ to the output of the divider circuit represented by $F_2/K$ is set equal to 10 times S, where S is the seed spacing in inches per seed, or:

$$\frac{F_x}{\frac{F_2}{K}} = 10S, \text{ substituting for } F_x \text{ and } F_2,$$

$$\frac{.714X}{\frac{1600}{SHK}} = 10S,$$

$$\frac{XHK}{2241} = 10$$

Simplification of this equation, $KHX = 22410$. X is the constant distance multiplier which is set by varying the adjustable resistor 98 on FIG. 3. Thus, KH must be constant. K is chosen so that it will be an integer for all values of H, so that the constant HK is equal to 1440. Therefore, X is equal to 15.56. This value of X is obtained by varying the adjustable resistor 98 on FIG. 3. The ability to adjust this value of X by resistor 98 also enables one to compensate for various circumferences of press wheels that may be used without any major circuit revisions.

It can now also be seen that different values of H (number of drum holes per planting row) may be accomodated by three simple modifications: (1) choosing proper values for additional resistors to be wired in parallel with resistors 232 through 236 of FIG. 3; (2) replace switch 237 of FIG. 3 with a switch having enough terminals to accomodate the new resistors; (3) modify the connections to dividers 359 and 360 of FIG. 4 (or choose new divider IC's) to accomodate the new values of H.

Referring again to FIG. 3, the control system also incorporates circuitry to warn the user of various possible malfunction situations. If the drum for some reason fails to turn or is stuck, the readout will go blank. The circuit accomplishing this result comprises resistors 386 and 388, capacitor 390, diodes 392 and 394, and a gate defined by terminals 396, 397 and 398 in integrated circuit package 218. As long as drum pulses are being received, capacitor 390 remains charged through resistor 386 and diode 392. This charge creates a logical 1 which is transferred through the gate defined by terminals 396, 397 and 398 in integrated circuit package 218 and reverse biases diode 394. The resulting output at point R goes to point R' on FIG. 4, allowing the update blanking circuitry defined by resistors 373 and 374, capacitor 379, transistor 384, and gates defined by terminals 403, 404, 405 and by terminals 406, 407 and 408 in integrated circuit package 375 to operate normally. If no pulses are being received capacitor 390 is discharged through resistor 388 causing a logical 0 to be transmitted through the gate defined by the terminals 396, 397 and 398 in integrated circuit package 218 pulling diode 394 to ground. This forces the logical 0 to the input point R' of FIG. 4 causing a gate defined by terminals 406, 407 and 408 of integrated circuit package 375 to continuously blank the readout.

Still referring to FIG. 3, the system also includes circuitry to warn the user of excessive drum rotational speed. When the drum rotational speed exceeds a pre-set maximum, the readout blanks out for ½ second out of every second. This function is accomplished through the circuit containing resistors 414, 416, 418, 420, 422, 424 and 426, capacitors 428 and 430, diodes 394 and 432, the gate defined by terminals 396, 397 and 398 in integrated circuit package 218 and two operational amplifiers defined by terminals 434, 435 and 436 and by terminals 437, 438 and 439 in integrated circuit package 182. The function of this circuit is as follows: Resistor 424 and capacitor 430 integrate the pulses from terminal 216 to a DC voltage which is proportional to the drum rotational speed. This voltage is then compared by the operational amplifier defined by terminals 437, 438 and 439 in integrated circuit package 182, to a voltage that is pre-set using the voltage divider of resistor 422 and variable resistor 426, from the 8-volt supply source. This pre-set reference voltage corresponds to the maximum drum rotational rpms above which it is desired to provide a warning. If the drum rotational speed is below this pre-set maximum the inverting input 438 of the operational amplifier defined by terminals 437, 438 and 439 in integrated circuit package 182 is dominant, pulling diode 432 to ground, and clamping the voltage across capacitor 428 to ground. This forces the inverting input 435 of the operational amplifier defined by terminals 434, 435 and 436 in integrated circuit package 182 to ground, allowing the non-inverting input 436 to become dominant thereby producing a logical 1 at the output 434. This logical 1 is transmitted through the gate defined by terminals 396, 397 and 398 in integrated circuit package 218 to reverse bias diode 394. This allows the update blanking circuitry of FIG. 4 to operate normally in the same manner as described above. If the drum rotational speed is above the pre-set warning level, the voltage developed across capacitor 430 exceeds the pre-set voltage set by resistors 422 and 426 causing the non-inverting output, at terminal 437, of the operational amplifier defined by terminals 437, 438 and 439 in integrated circuit package 182 to become dominant, producing a logical 1 at the output thereby reverse biasing diode 432. With diode 432 reverse biased, resistors 416, 418 and 420, capacitor 428 and the operational amplifier defined by terminals 434, 435 and 436 in integrated circuit package 182 constitute an oscillator. The values of resistors 416, 418, 420 and capacitor 428 are chosen such that the oscillator produces a logical 0 for ½ second and a logical 1 for ½ second. These logical 0's and 1's are then transmitted through the gate defined by terminals 396, 397 and 398 in integrated circuit package 218 through the diode 394 to the readout blanking circuit 3 of FIG. 4 described above, which then blanks the readout according to the 0's and 1's for ½ second out of every second.

The readout will also go blank completely if no ground speed pulses are being received which indicates either a broken cable, or that the ground speed is too low to provide a usable signal. This is accomplished through resistors 440, 442 and 444, capacitor 446, diodes 448 and 450, the gate defined by terminals 452, 453 and 454 in integrated circuit package 218 and the operational amplifier defined by the terminals 456, 457 and 458 in integrated circuit package 182. As long as usable ground speed pulses are being received, capacitor 446 is kept charged through resistor 440 and diode 448. This makes the non-inverting input, at terminal 457 of the operational amplifier defined by terminals 456, 457 and 458 of integrated circuit package 182, dominant, producing a logical 1 at the output, at terminal 458. This is fed through the gate defined by terminals 452, 453 and 454 in integrated circuit package 218 to reverse bias diode 450. This produces a logical 1 at point R, allowing the update blanking circuitry of FIG. 4 to operate normally, in a manner similar to that described above when there is a logical 1 at point R. If no usable ground speed pulses are received, capacitor 446 is discharged through resistor 442. This allows the inverting input at terminal 456 of the operational amplifier defined by terminals 456, 457 and 458 in integrated circuit package 182 to become dominant which produces a logical 0 at the output. This is then transmitted through the gate defined by terminals 452, 453 and 454 in integrated circuit package 218, pulling diode 450 to ground, and thereby transmitting a logical 0 to point R' of FIG. 4 forcing the blanking circuit of FIG. 4 to blank the readout, in the same manner as the readout is blanked for a loss of drum rotational signal, as described above.

This same logic signal from terminal 452 is also used as a minimum speed cutoff, to turn off the drum motor completely when the ground speed of the planter becomes too low to provide a usable input signal. The signal at terminal 452 is fed to the two gates at terminals 215 and 224 in integrated circuit package 218 and is coupled by diode 460 to the non-inverting input, 310, of the operational amplifier defined by terminals 308, 309 and 310 in integrated circuit package 50. As long as this signal from terminal 452 remains in the logical 1 state, indicating that a minimum ground speed of the planter is being exceeded, the two gates controlled by terminals 215 and 224 in integrated circuit package 218 continues to transfer the ground speed and drum rotational speed information through the circuit. If the planter ground speed falls below the minimum speed, the signal line from terminal 452 goes to the logical 0 state and turns off the gates at terminals 215 and 224 of integral circuit package 218 cutting off the ground speed and drum speed signals. Turning off these gates controlled by terminals 215 and 224 in integrated circuit 218 allows the circuitry following these gates to remain at near equilibrium condition without being distorted because of inaccurate input information. The transmission gates controlled by terminals 278 and 318 in integrated circuit, package 212, are also connected to the logic line coming from terminal 452 and the gates in integrated circuit 218 and are turned off in the same way as gates at terminals 215 and 224 in integrated circuit 218 already described. This results in no signal at terminals 336 and 337, thus causing the drum motor to stop. The diode 460 is included to insure that the motor drive circuitry is then completely shut off. This is necessary to keep capacitor 298 discharged, since leakage current out of the operational amplifier defined by terminals 308 and 309 and 310 in integrated circuit 50 tends to charge capacitor 298 which eventually will turn the motor back on for a few revolutions until the resistor 286 can discharge it. The result is a drum creep. Diode 460 prevents this from happening.

Figure 5:
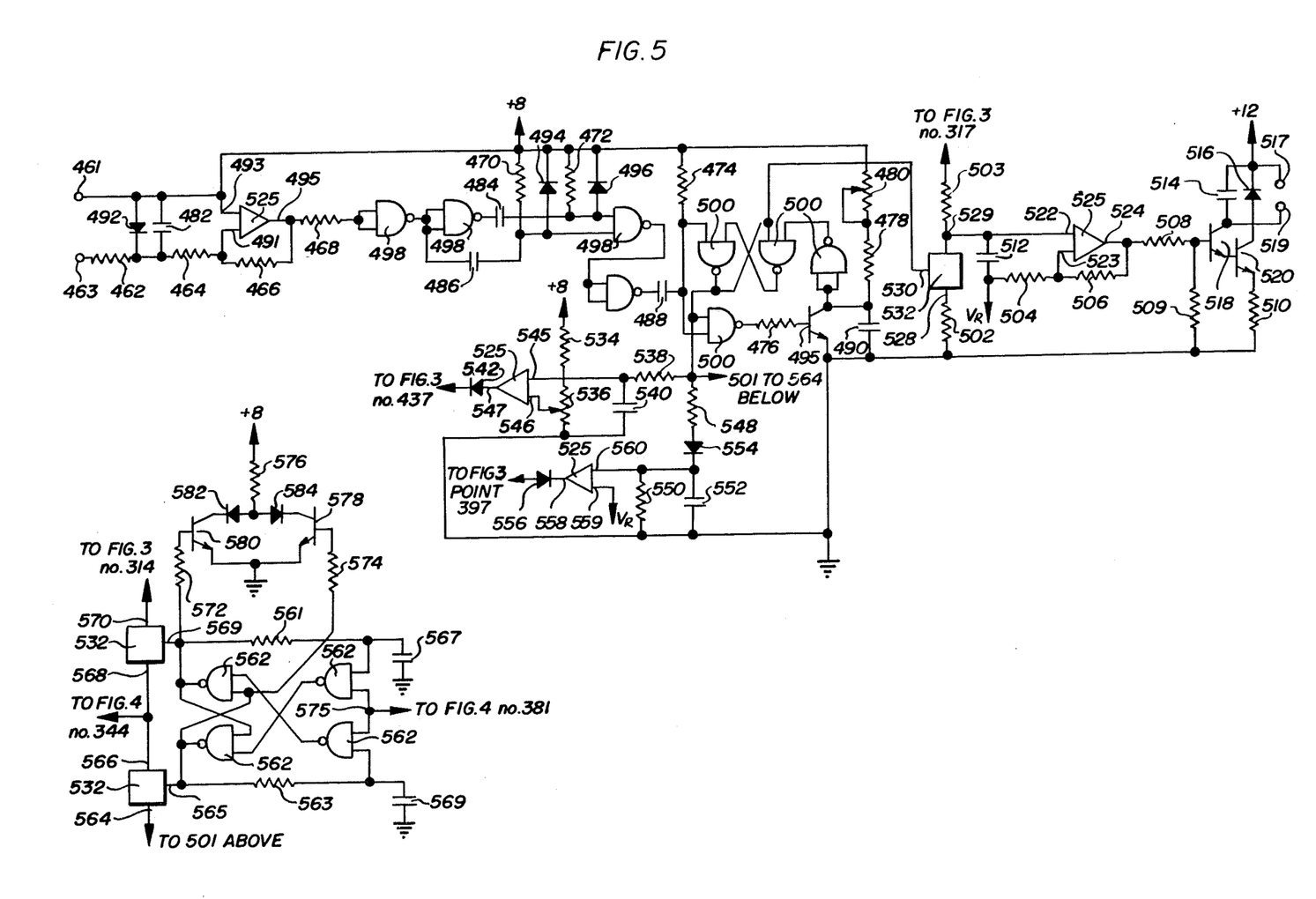

FIG. 5 represents additional circuitry that may be used for systems in which two rotating drums are used on the planter. The second rotating drum would be provided with its own motor and alternator drive and a transducer identical to that already described for the first drum. The terminals 461 and 463 come from the output of a coil sensing the rotation of a 20-pole circular magnet mounted on the motor shaft of the second rotating drum in the same manner as previously described for the first rotating drum. The following circuitry consisting of resistors 462, 464, 466, 468, 470, 472, 474, 476, 478 and 480, capacitors 482, 484, 486, 488 and 490, diodes 492, 494 and 496, transistor 495, gate package 498 and gate package 500 constitute a drum input pulse shaper, doubler, and one-shot circuit that are equivalent both in interconnection and in function to the circuitry previously described as performing the functions of input pulse shaper, doubler and one-shot for the first rotating drum. The circuit composed of resistors 502, 503, 504, 506, 508, 509 and 510, capacitors 512 and 514, diode 516, transistors 518 and 520, and an operational amplifier that is defined by terminals 522, 523 amd 524 in integrated circuit package 525 and a transmission gate defined by terminals 528, 529 and 530 in integrated circuit package 532 constitutes an instantaneous motor speed control circuit which is equivalent in interconnection and in function to the quick recovery output stage previously described for the first rotating drum. For the system in which two rotating drums are used, resistor 503 is fed by the same voltage source as resistor 284 of the single drum setup. Resistor 480 adjusts the pulse width of the one-shot to obtain a 1 to 1 ratio between the motor speeds of the two rotating rums. When this 1 to 1 ratio has been set the rotational speed of both drums will be directly proportional to the voltage developed across the resistors 284 and 503, respectively. The circuitry composed of resistors 534, 536 and 538, capacitor 540, diode 542, and an operational amplifier defined by terminals 545, 546 and 547 in integrated circuit package 525 is equivalent in interconnection and in function to the circuit previously described for detecting excessive drum rotational speed for the single drum system. This circuit is connected into the first drum rotation detection circuit by diode 542, which is connected to the non-inverting input 437, of the operational amplifier defined by terminals 437, 438 and 439 in integrated circuit package 182, in FIG. 3. The circuit composed of resistors 548 and 550, capacitor 552, diodes 554 and 556, and operational amplifier defined by terminals 558, 559 and 560 in integrated circuit package 525 detects failure of the drum to turn. This circuit is equivalent in the interconnection of its components and in its function to the circuit previously described for detecting failure of the drum to turn in the single drum system. This circuit is interconnected with the single drum circuits of FIG. 3 by the diode 556, which is connected to terminal 397 of the gate defined by terminals 396, 397 and 398 in integrated circuit package 218, of FIG. 3.

Four gates in integrated circuit package 562 along with resistors 561 and 563, and capacitors 567 and 569, are connected to form a flip-flop which alternately turns on transmission gates defined by terminals 564, 565 and 566 and by terminals 568, 569 and 570 in integrated circuit package 532. The trigger for the flip-flop which enters at terminal 575 comes from the signal at point 381 of FIG. 4 which generates the new update reading in the digital readout of FIG. 4. The two transmission gates of integrated circuit package 532 then alternately select signals from either the first rotating drum pulse circuit at terminal 314 of the gate in integrated circuit 112 of FIG. 3, which is fed to terminal 570 of gate 532, or from the corresponding point in the second drum pulse circuit, 501 in FIG. 5 which is fed into terminal 564 of the second gate in integrated circuit package 532. The selected signals are then fed from terminals 566 or 568 of the gates in integrated circuit 532 to the input of integrated circuit 344 of FIG. 4, as each gate 532 is alternately pulsed. Resistors 572, 574 and 576 and transistors 578 and 580 also receive pulses from the flip-flop to alternately turn on light emitting diodes 582 and 584 to indicate whether the digital readout is indicating the first or the second drum. While the digital readout is displaying one of the drums in operation, the counters 353, 354 and 355 are reset and counting on the other drum waiting for an update pulse, at which time they will latch onto that drum's number and display its operation.

The power supplied for the circuitry and input polarity protection is shown in FIG. 3 in the lower righthand portion. Plus 12 volts DC from the tractor battery is fed into a 4-amp fuse 590 which protects the circuits against excessive current. Diode 592 provides polarity protection to insure that the circuitry cannot be harmed by the user incorrectly connecting the power leads. Capacitor 594 acts as a filter to filter out any ripple or noise coming in on the 12-volt supply line from the tractor battery. Integrated circuit 596 is a 5-volt regulator with an associated filter capacitor 598 to supply plus 5 volts for the circuitry. Integrated circuit 600 is an 8-volt regulator with an associated filter capacitor 602 to supply plus 8 volts for the circuitry. Resistor 604 and zener diode 606 provide a third voltage source for the circuitry. The on-off switch 608 is located in the negative supply line.

As a specific example to which no limitation is intended, the designations of the integrated circuit packages of the illustrated embodiment are as follows:

| Illustration Number | Designation |
|---|---|
| 56, 84, 196, 208, 498, 500, 562 | CD4011AE |
| 218 | CD4081BE |
| 112, 212, 532 | CD4016AE |
| 50, 182, 525 | LM324N |
| 114, 116, 238, 272 | CA3130S |
| 596 | UA 7805 |
| 600 | UA 7808 |
| 375 | CD4001AE |
| 340, 344 | CD4024AE |
| 359, 360 | CD4017AE |
| 353, 354, 355 | SN74144N |

While a preferred embodiment of the present invention has been shown and described herein, various changes and modifications may be made without departing from the spirit and scope of the appended claims.

The invention is claimed as follows:

1. An automatically controlled mobile seed planter apparatus having at least one rotatable drum means for holding a plurality of seeds, motor means for rotating the drum means, said drum means having a plurality of holes, said holes being smaller than said seeds, air pressure means for holding a plurality of said seeds against said holes as said drum means rotates, and means for releasing said seeds from said holes at a predetermined point in the rotation of said drum means, a means for receiving said seeds from said releasing means, and forming a path of travel for the passage of seeds therethrough to a desired point of discharge, variable speed control means for said motor means, a first transducer means for detecting the rotational speed of said drum means and providing a drum speed signal, second transducer means for detecting the speed of said planter along the ground and providing a ground speed signal, control means comprising input means for providing both a desired seed spacing signal and a drum hole configuration signal, means for receiving said drum speed, ground speed, drum hole configuration, and desired seed spacing signals, means for comparing said desired seed spacing signal with said drum hole configuration signal, said ground speed signal and said drum speed signal, means for providing an output control signal from said comparing means to said variable speed control means, to adjust the variable speed control means in response to changes in the drum speed signal, the ground speed signal, the drum hole configuration signal or the desired seed spacing signal and combinations thereof, for maintaining desired seed spacing corresponding to said desired seed spacing signal, means for combining said drum speed signal and said ground speed signal and providing an expected seed spacing signal in response thereto, readout means for displaying said expected seed spacing signal, means for detecting excessive rotational speed of the drum, absence of drum rotation, absence of drum speed signal, and absence of ground speed signal of a minimum predetermined value and producing malfunction signals in response thereto, and means for displaying said malfunction signals.

2. The apparatus of claim 1 wherein said motor means comprises a DC permanent magnet motor.

3. The apparatus of claim 2 wherein said variable speed control means for said motor includes an alternator connected to said motor to provide a source of power therefor.

4. The apparatus of claim 3 wherein said alternator is field controlled by said output control signal means of said control means.

5. The apparatus of claim 2 wherein said first transducer means includes a multiple pole circular magnet mounted on the shaft of said motor, and a wire-wound coil sensing the magnetic poles of said magnet.

6. The apparatus of claim 1 wherein said planter has a shaft connected with a wheel in contact with the ground.

7. The apparatus of claim 6 wherein said second transducer means includes a multiple pole circular magnet mounted to said shaft of said wheel and a wire-wound coil sensing the magnetic poles of said magnet.

8. An apparatus for automatically controlling the spacing between a plurality of discrete articles which are deposited by movable dispensing means transported along a path of travel, said dispensing means being driven by variable speed drive means for successively dispensing said articles at a rate in accordance with the speed of said drive means, said apparatus comprising: first sensor means for detecting the speed of said drive means and providing a first signal corresponding to said speed, second sensor means for detecting the rate of movement of said dispensing means along said path of travel and providing a second signal corresponding to said rate, control means comprising selector means for providing a desired article spacing signal, means for receiving and comparing said first signal, said second signal and said desired article spacing signal, adjustment means coupled to said variable speed drive means to adjust the speed of said variable speed drive means in response to changes in said first signal, said second signal, said desired article spacing signal and combinations thereof, for maintaining a desired spacing between deposited articles in accordance with the selected desired article spacing signal.

9. A control system for a seed planter having means for holding a quantity of seed, means for releasing said seeds at a variable rate of speed, movable across an area to be planted, said control system comprising a first means for detecting the speed of said releasing means and providing a releasing speed signal, a second means for detecting the speed of said planter along the ground and providing a ground speed signal, control circuit means comprising selector means for providing a desired seed spacing signal, means connected with said first and second means and said selector means for receiving and comparing said desired seed spacing signal, said seed releasing speed signal and said ground speed signal, means for providing an output control signal from said comparing means to said variable speed releasing means for adjusting the variable speed releasing means in response to changes in the seed releasing speed and to changes in the ground speed of the planter, for maintaining a desired seed spacing in accordance with the desired seed spacing signal.

10. The control system of claim 9, further including means connected with said first and second detecting means for combining said releasing speed signal and said ground speed signal and providing an expected seed spacing signal corresponding thereto, and readout means connected with said combining means for displaying said expected seed spacing signal.

11. The control system of claim 9, further including means connected with said releasing means for detecting excessive speed of said releasing means and absence of said releasing speed signal, and providing malfunction signals in response thereto, and means for displaying said malfunction signals.

12. The control system of claim 9, further including means connected with said second detecting means for detecting absence of said ground speed signal of at least a predetermined minimum value and providing a malfunction signal in response thereto, and means for displaying said malfunction signal.

13. The control system of claim 12, further including means for stopping the operation of said releasing means in response to said malfunction signal.

14. The control system of claim 9, wherein said control circuit means is contained in a housing having a control panel accessible to the operator of said planter.

15. The control system of claim 9, wherein said releasing means comprises a rotatable drum.

16. The control system of claim 9, further including means connected with said first and second detecting means for combining said releasing speed signal and said ground speed signal and providing an expected speed spacing signal corresponding thereto, readout means connected with said combining means for displaying said expected seed spacing signal, means connected with said releasing means for detecting excessive speed of said releasing means and providing a first malfunction signal in response thereto, means for detecting the absence of said releasing speed signal and providing a second malfunction signal in response thereto, means connected with said second detecting means for detecting absence of said ground speed signal of at least a predetermined minimum value, and providing a third malfunction signal in response thereto, and means for displaying said first, second and third malfunction signals, means for stopping the operation of said releasing means in response to said third malfunction signal, and housing means for holding said control circuit means, said readout means and said displaying means said, housing means having a control panel accessible to the operator of said planter.

17. A control system of claim 16, wherein said readout means is in digital form.

18. The control system of claim 17, wherein said releasing means comprises a plurality of rotatable drums.

19. The control system of claim 18, wherein said readout means includes means for alternately selecting and displaying the expected seed spacing signal from each of said rotatable drums, and means for identifying the rotatable drum thereby selected.

* * * * *

UNITED STATES PATENT OFFICE
CERTIFICATE OF CORRECTION

Patent No. 4,085,862          Dated April 25, 1978

Inventor(s) David Eugene Steffen

It is certified that error appears in the above-identified patent and that said Letters Patent are hereby corrected as shown below:

Column 6, line 11, after "$T_2 = T_x$" insert: --(by adjusting variable resistor 200)--;

Column 6, line 35, "$V_{251} = (R'/R' + R'')\ Vcc$" should be $--V_{251} = \frac{R'}{R' + R'}\ Vcc--$;

Column 11, line 59, change "amd" to --and--

Signed and Sealed this

Third Day of October 1978

[SEAL]

Attest:

RUTH C. MASON
*Attesting Officer*

DONALD W. BANNER
*Commissioner of Patents and Trademarks*